United States Patent [19]

Engelsmann et al.

[11] Patent Number: 4,482,232

[45] Date of Patent: Nov. 13, 1984

[54] FILM CARTRIDGE AND/OR CAMERA WITH FILM ARRESTING MEANS

[75] Inventors: Dieter Engelsmann, Unterhaching; Hubert Hackenberg, Holzkirchen; Renate Torke, Munich, all of Fed. Rep. of Germany

[73] Assignee: Agfa-Gevaert Aktiengesellschaft, Leverkusen, Fed. Rep. of Germany

[21] Appl. No.: 353,583

[22] Filed: Mar. 1, 1982

[30] Foreign Application Priority Data

Mar. 18, 1981 [DE] Fed. Rep. of Germany ....... 3110622

[51] Int. Cl.³ .............................................. G03B 17/26
[52] U.S. Cl. .................................. 354/275; 242/71.1; 242/71.7
[58] Field of Search .................. 354/275; 242/71, 71.1, 242/71.2, 71.7; 352/78 R

[56] References Cited

U.S. PATENT DOCUMENTS

| | | | |
|---|---|---|---|
| 3,227,058 | 1/1966 | Hochreiter | 354/275 |
| 3,317,154 | 7/1967 | Leslie | 242/71.2 |
| 3,747,865 | 7/1973 | Tobey | 242/71.1 |
| 4,176,938 | 12/1979 | Weiss et al. | 354/275 |
| 4,333,615 | 6/1982 | Kluczynski et al. | 242/71.1 |

Primary Examiner—A. A. Mathews
Attorney, Agent, or Firm—Michael J. Striker

[57] ABSTRACT

A film cartridge, particularly associated with a camera, has a housing bounding a light-tight film roll chamber, and a mouth member arranged for passing a film therethrough and located outside the light-tight film roll chamber. The mouth member has a wall and at least one slot-shaped opening extending in a film transport direction and arranged so as to allow a film actuating member to engage therethrough a film received in the mouth member. Arresting means provided in the mouth member is engageable with an initial portion of the film and disengageable from the latter by camera-actuated means.

25 Claims, 7 Drawing Figures

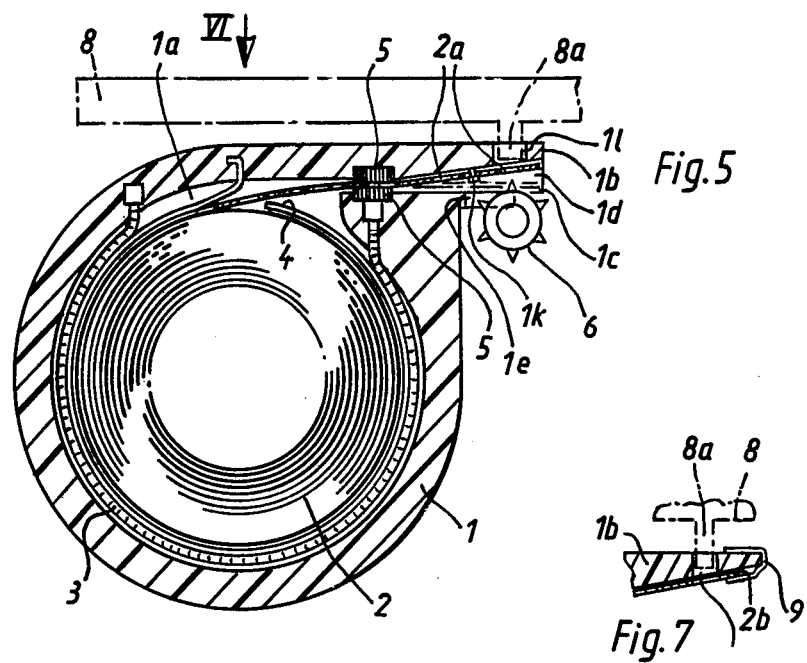
Fig.5
Fig.7
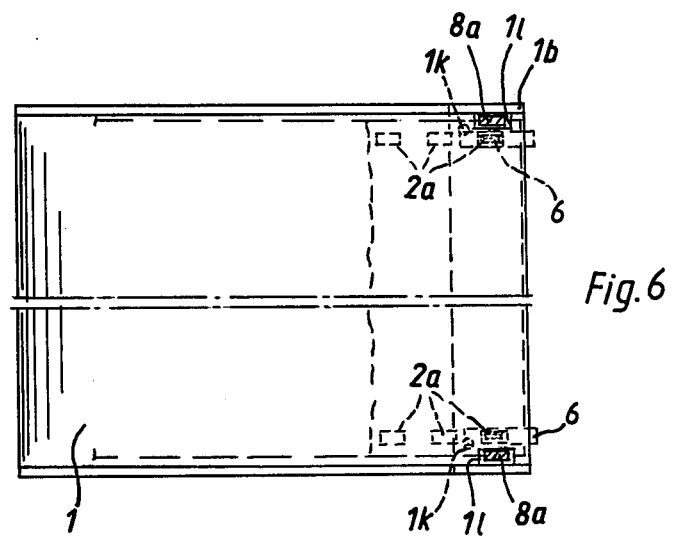
Fig.6

FILM CARTRIDGE AND/OR CAMERA WITH FILM ARRESTING MEANS

BACKGROUND OF THE INVENTION

The present invention relates to a film cartridge with a light-tight film coil chamber and a film mouth part for passing a film and/or an associated camera.

Such film cartridges and associates cameras are known, for example, as so-called miniature cartridges and miniature cameras or as cartridges and cameras protected by a trademark AGFA RAPID. Both cameras are provided with automatic film threading devices for transporting an initial portion of the film extending out of the cartridge to a film spool space, and the miniature cameras are also provided with a return spool device. The initial portion of the film extending outwardly of the cartridge or its mouth part is coiled outwardly around the cartridge, so that the cartridge in this form is located in a bush. The initial portion of the film during insertion of a cartridge into a camera has a considerable rolling tendency. Moreover, when the cartridge is located neither in a bush nor in a camera, the initial portion of the film is not protected against damages. The rolling tendency as well as eventual damages can undesirably counteract a required automatic film threading in a camera.

SUMMARY OF THE INVENTION

Accordingly, it is an object of the present invention to provide a cartridge and/or a camera which avoids the disadvantages of the prior art.

More particularly, it is an object of the present invention to provide a cartridge and/or a camera in which the initial portion of a film is located in a protected manner in a mouth part of the cartridge and nevertheless can automatically be threaded from the same and transported into the spool chamber of a camera as well as returned into the cartridge.

In keeping with these objects and with others which will become apparent hereinafter, one feature of the present invention resides, briefly stated, in a film cartridge and/or a camera, in which a mouth member of the cartridge is located outside a light-tight film roll chamber and has a wall provided with a least one slot-shaped opening extending in a film transport direction and arranged so as to allow a film transport member of the camera to engage therethrough a film received in the mouth member.

When the film cartridge and/or the camera are designed in accordance with the present invention, they eliminate the above-listed disadvantages of the prior art.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view corresponding to the view of FIG. 3, but showing the cartridge in accordance with another embodiment of the present invention;

FIG. 6 is a plan view of the cartridge of FIG. 5 in direction 6; and

FIG. 7 is a view showing a portion of a mouth part of the film cartridge, in accordance with a further embodiment of the present invention.

DESCRIPTION OF PREFERRED EMBODIMENTS

Figure 1:
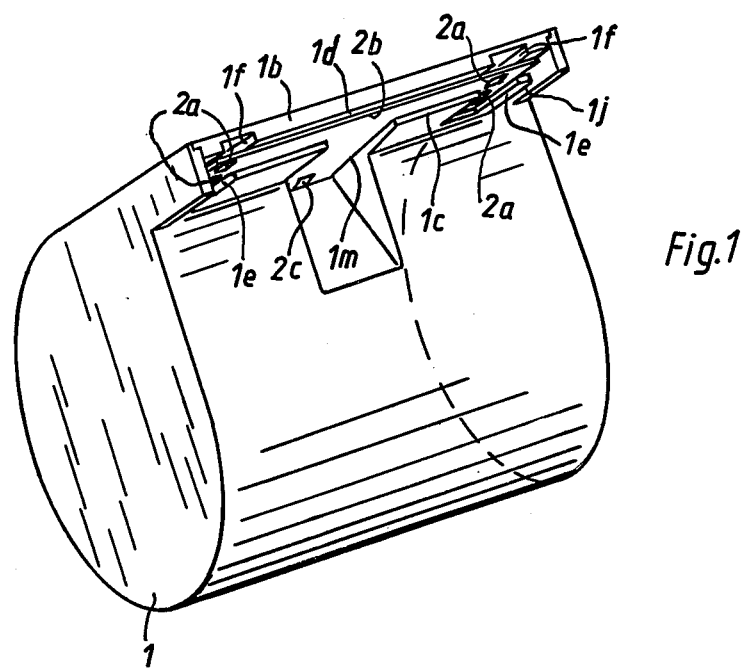
FIG. 1 is a perspective view showing a cartridge of the present invention, as seen from a film side.
Figure 2:
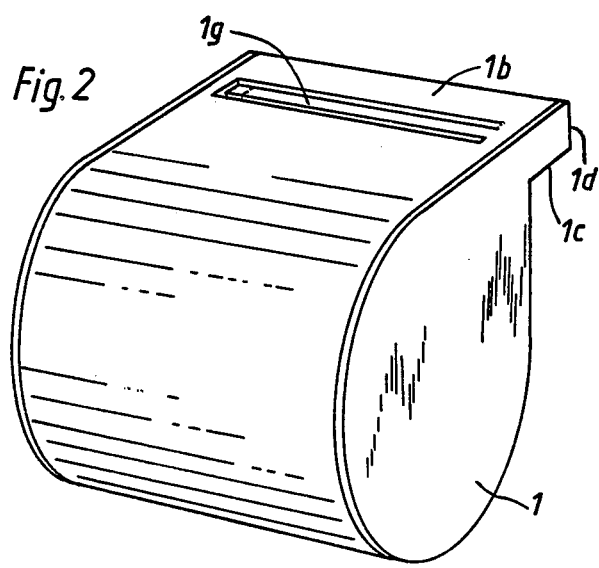
FIG. 2 is a view substantially corresponding to the view of FIG. 1, but showing the inventive cartridge at a rear side.

A substantially cylindrical roll film cartridge is identified by reference numeral 1. It can have known means for forming a film coil 2. This means can include one or two helical spring loops 3 and a slide foil 4 provided between the same and the outer layer of the film coil 2, as disclosed in the German Pat. No. 1,267,536. This means can also be formed as spiral springs which is known from the so-called AGFA RAPID cartridges, or as a film spool connected in a known manner with an outwardly extending film spool key or a gear.

In dependence upon the construction of the film 2 or its perforation 2a, it is possible to transport the film by a camera-side perforation wheel 6 or two perforations wheels 6 connected with one another, into a camera side spool camera and again back into the cartridge 1. It is also possible, when each frame is provided with a perforation hole, to pull the film by a gripper out of a cartridge 1 into a camera side spool chamber. When the gripper is reversible, it is possible to move the film back into the cartridge 1 or to displace the film from the cartridge 1 into another similar cartridge by the gripper or with the aid of a film spool cam engageable with the above-described film spool key, or a camera-side gear engageable with the gear connected with the film spool. The present invention can be used for all known roll film cartridge types.

The cartridge has an inner chamber 1a which receives the film coil 2 and is provided with known light-tight means such as, for example, a plush seal 5 in a film mouth member. This means also can be formed as a protective paper pack which engages in a labyrinth at the end side of the inner chamber of the cartridge or wound over cylindrical parts of a film spool, engaging the coil 2. Such a protective paper strip must be connected with the initial portion of the film and have the same perforations as the film has, so that the protective paper strip located in the mouth member can also be transported similarly to the initial portion of the film.

The film mouth member or part 1d is formed by two lips 1b and 1c and extends, advantageously but not necessarily, tangentially to the cylindrical cartridge 1. It extends, at least at its ends serving as a film entrance, parallel to the associated camera-side film gate.

The film mouth 1b extends outwardly of the light-tight coil chamber 1a or the light-tight means 5 located immediately after the coil chamber. The film mouth member extends beyond the outer contour of the cylindrical cartridge 1 by a certain piece. This piece is so great that when the cartridge is inserted in the camera, it extends into the region of a film transport and/or film length determining means 6 of the camera. The lip 1c has a slot 1e extending in a film transport direction and provided in the region in which the lip 1c is associated with the transport member 6, and in any event in the region outside the image field of the film 2 when the film has perforations 2a, the slot 1e is provided in the region of the perforations. The lip 1b has an associated depression 1f at its side facing toward the film.

Figure 3:
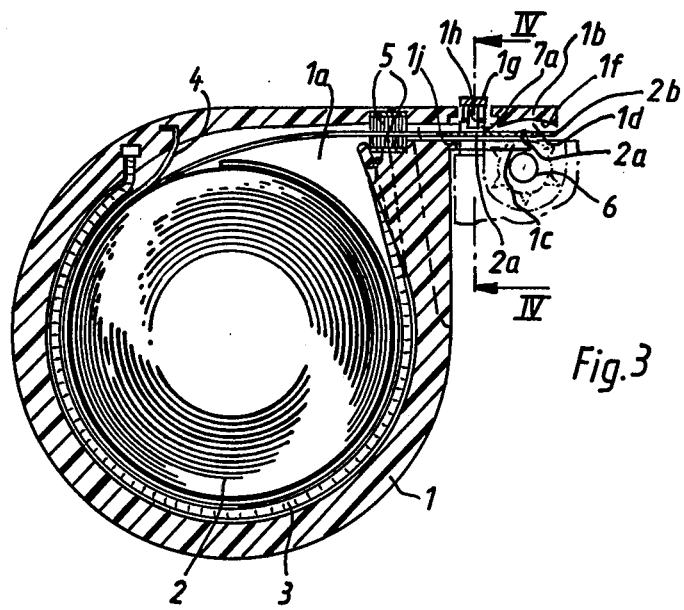
FIG. 3 is a view showing the section of the inventive film cartridge of FIG. 1, taken in a direction parallel to the film longitudinal direction.
Figure 4:
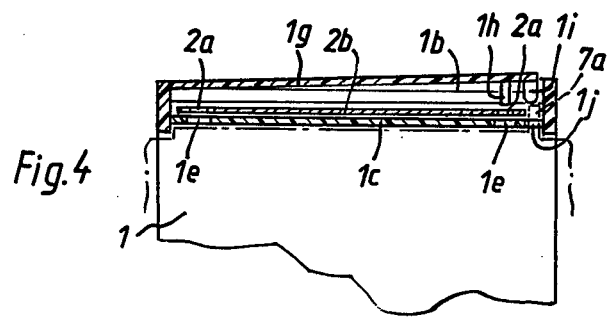
FIG. 4 is a view showing a section of the film cartridge, taken along line 4—4 in FIG. 3.

When the cartridge 1 is inserted in a camera 7 schematically shown in FIG. 3, the camera side film transport and/or film length determining member 6 can engage in the perforation 2a of the initial portion of the film 2b and to transport the initial portion of the film 2b as well as the whole film out of the cartridge 1 and again back into the cartridge. This is particularly the case when the film transport member has a perforation wheel 6 rotatable in both directions of rotation. When the transport member is formed as a gripper, the gripper must be reversible, or a coil spool must be provided in the cartridge and driven from outside in return direction.

Because of the elongated construction of the film mouth member 1b with the slot 1a for insertion and the depression 1f for penetration of the camera-side film transport and/or film length determining member, it is attained that the initial portion of the film 2b is fully protected in the film mouth member 1d, and despite this can be coiled completely automatically in the camera—or a camera side film receiving chamber, or on a camera-side film coiling spool.

For providing engagement of the perforation wheel 6 in the perforation 2a when the perforated film 2 is utilized and the initial portion 2b assumes its position in the slot 2e, it is advantageous to have a releasable blocking or locking means between the film mouth member 1d and the initial portion 2b of the film. When there is no simple conventional friction means, it is necessary to have, for example, a thickening on the initial portion 2b of the film releasable by a camera-side means. As can be seen from FIGS. 1-4, a spring tongue 1g is provided on the lip 1b facing away from the film transport member 6 and having an arresting pin 1h located in a perforation region and a projection 1i located outside of the longitudinal edges of the film, formed for example as a freestanding tongue. A further passage 1j is provided in the lip 1c in the region of the projection, and a camera side pin 7a extends through this passage when the cartridge is inserted into the camera so as to lift the projection 1i and thereby the arresting pin 1h from the associated perforation 2a. Thereby the arresting action is released as long as the cartridge 1 is received in the camera 7.

Another possibility for the releasable fixation of the initial portion 2b in the film mouth member 1d is shown in FIGS. 5 and 6. The film mouth member 1d in these Figures, as well as in FIG. 7, has a wedge-shaped cross-section which increases outwardly. The lip 1d facing away from the transport member is provided at its inner side outside of the image field with at least one push button-like arresting pin 1k which engages in a hole without reference numeral. A passage 1l is provided in the lip 1b inwardly of the film exit slot adjacent to the latter. A projection 8a of a camera cover 8 presses against the film 2 through the passage 1l in the closed camera, and separates the film 2 from the arresting pin 1k. Whereby the film 2 arrives at the position shown in dash-dot lines in FIG. 5 and in engagement with the perforation wheels 6. Instead of this construction, it is also possible as shown in FIG. 7 to glue the initial portion 2b of the film by a paper strip 9 with the lip 1b at the end side, and then tear the strip 9 by the projection 8a, for example along a perforation.

When the film 2 after the exposure is wound back into the cartridge, for example with the aid of the perforation wheels 6, and the cartridge 1 is removed from the camera 7, 8, the film 2 can be engaged through the slot 1e at the perforation 2a or through an additional passage 1m at an additional cutout 2c, and removed from the passage 1 through the film mouth member 1d. At this time the arresting pin 1h or 1k is released, in some cases simultaneously.

It is to be understood that instead of the perforation wheels 6, piercing wheels can be provided for piercing a non-perforated film. The pin 1h can cut in the initial portion of the non-peforated film outside an image field region.

It will be understood that each of the elements described above, or two or more together, may also find a useful application in other types of constructions differing from the types described above.

While the invention has been illustrated and described as embodied in a film cartridge and/or a camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the present invention.

What is claimed as new and desired to be protected by Letters Patent is set forth in the appended claims:

1. A film cartridge, comprising a housing bounding a light-tight film roller chamber; a mouth member arranged for passing a film therethrough and located outside said light-tight film roll chamber, said mouth member having a wall provided with at least one slot-shaped opening extending in a film transport direction and arranged so as to allow a film actuating member to engage therethrough a film received in said mouth member; arresting means provided in said mouth member and engageable with an initial portion of the film; and camera-actuated means arranged to bring said arresting means out of the engagement with the initial portion of the film.

2. A film cartridge as defined in claim 1, wherein the film has a plurality of perforations, said opening being arranged so that the film actuating member can engage therethrough the perforations of the film.

3. A film cartridge as defined in claim 1, wherein the film actuating member is arranged at a side of a camera, said opening being arranged so that said camera-side film actuating member can engage the film therethrough.

4. A film cartridge as defined in claim 1, wherein the film has two rows of perforations, said wall having two such openings arranged so that the film actuating member can engage the film therethrough.

5. A film cartridge as defined in claim 1, wherein said arresting means includes a blocking element.

6. A film cartridge as defined in claim 1, wherein said arresting means includes a locking element.

7. A film cartridge as defined in claim 1, wherein said arresting means includes a push button like projection engageable into a hole.

8. A film cartridge as defined in claim 1, wherein said mouth member has a lip, said arresting means including a strip connecting the initial portion of the film with said lip of said mouth member.

9. A film cartridge as defined in claim 1, wherein said arresting means includes an arresting member, said mouth member having another wall, and one of said walls being adjacent to said arresting member and provided with a passage, said arresting means further including a pin passing through said passage and urging the initial portion of the film from said arresting member.

10. A film cartridge as defined in claim 9, wherein said pin is arranged at a side of a camera.

11. A film cartridge as defined in claim 9, wherein said pin is arranged at a side of a camera cover.

12. A film cartridge as defined in claim 1, wherein said mouth member has another wall, said arresting means including a spring arm provided on one of said walls, a pin extending toward the initial portion of the film, and a return tongue at least engaging in a passage of the other of said walls, said passage and said return tongue being located outside a longitudinal edge of the film.

13. A film cartridge as defined in claim 12, wherein said pin of said arresting means extends through said passage in said other wall.

14. A film cartridge as defined in claim 12, wherein said pin of said arresting means is arranged to engage in a perforation of the film.

15. A film cartridge as defined in claim 12, wherein said pin of said arresting means is arranged so as to cut in the initial portion of the film outside an image field region.

16. A film cartridge as defined in claim 1, wherein the film has an initial portion provided with a recess, said mouth member having another wall, one of said walls being provided with an additional opening arranged for removing an exposed film from the cartridge and associated with the recess of the initial portion of the film.

17. A film cartridge as defined in claim 1, wherein said mouth member has another wall provided with a depression corresponding to said opening in said first-mentioned wall for allowing engagement of the film actuating member through an opening in the film.

18. A film cartridge as defined in claim 17, wherein said depression is arranged to allow engagement of the film actuating member through a film perforation forming the opening of the film.

19. A combination of a film cartridge with a camera having a film actuating member, the film cartridge comprising a housing bounding a light-tight film roll chamber; a mouth member arranged for passing a film therethrough and located outside said light-tight film roll chamber, said mouth member having a wall provided with at least one slot-shaped opening extending in a film transport direction and arranged so as to allow the film actuating member of the camera to engage therethrough a film received in said mouth member; arresting means provided in said mouth member and engageable with an initial portion of the film; and camera-actuated means arranged to bring said arresting means out of engagement with the initial portion of the film.

20. A combination as defined in claim 19, wherein said film actuating member is formed as a perforation wheel, said opening being arranged so that said perforation wheel can engage the film therethrough.

21. A combination as defined in claim 19, wherein the film has two rows of perforations, said wall of said mouth member of the cartridge has two such openings, said film actuating member of the camera including two perforation wheels connected with one another, said openings being arranged so that each perforation wheel engages a respective one of the rows of perforations through a respective one of said openings.

22. A combination as defined in claim 19, wherein said film actuating member is formed as a piercing wheel, said opening being arranged so that said piercing wheel can engage the film therethrough.

23. A combination as defined in claim 19, wherein the film has two rows of perforations, said wall of said mouth member of the cartridge has two such openings, said film actuating member including two wheels connected with one another and arranged outside an image field in engagement with a longitudinal edge of the film, said openings being arranged so that each wheel engages the film through a respective one of said opengings.

24. A combination as defined in claim 19, wherein said arresting means includes an arresting member, said mouth member having another wall, and one of said walls carrying said arresting member, said camera-actuated means including a pin provided at a camera side facing toward said one wall and extending through a passage and separating the initial portion of the film from said arresting member.

25. A combination as defined in claim 19, wherein said mouth member of the cartridge has another wall, said arresting means including a spring arm provided on one of said walls, a pin extending toward an initial portion of the film, and a return tongue at least engaging in a passage in the other of said walls, said passage and said tongue being located outside a longitudinal film edge, said camera-actuated means including a projection provided at a camera side facing toward said other wall and arranged so as to act upon said return tongue located in said passage and lift said pin from the initial portion of the film.

* * * * *